United States Patent [19]

Williams

[11] Patent Number: 4,536,936
[45] Date of Patent: Aug. 27, 1985

[54] METHOD OF FORMING A BRAKE DRUM

[75] Inventor: Richard J. Williams, Kenton, Ohio

[73] Assignee: Rockwell International Corporation, Pittsburgh, Pa.

[21] Appl. No.: 572,273

[22] Filed: Jan. 20, 1984

[51] Int. Cl.³ .................. B23D 11/02; F16D 65/10
[52] U.S. Cl. .................................. 29/447; 188/218 R
[58] Field of Search .................. 188/218 R, 264 R; 29/447

[56] References Cited

U.S. PATENT DOCUMENTS

| | | | |
|---|---|---|---|
| 2,740,502 | 4/1956 | Butterfield | 188/218 R |
| 2,888,105 | 5/1959 | Burnett | 188/218 R |
| 3,151,709 | 10/1964 | Troy | 188/218 R |
| 3,841,448 | 10/1974 | Norton | 188/218 R |
| 4,025,751 | 5/1977 | Wright | 29/447 |
| 4,266,638 | 6/1981 | Peterson et al. | 188/218 R |

*Primary Examiner*—Howard N. Goldberg
*Assistant Examiner*—Steven Nichols

[57] ABSTRACT

A method of forming a brake drum includes the steps of casting an iron cylindrical braking drum with a flange end and an opened end to include a plurality of generally axially extending fins around an exterior surface thereof. The casting includes providing the fins with radially extending side walls which diverge along a length thereof from the opened end to a widest distance therebetween at a predetermined location from the opened end and converge along the length thereof from the predetermined location to the flange end. Accordingly, adjacent side walls of adjacent fins define a space therebetween having its narrowest portion at the predetermined location. A braking surface is machined about an interior of the cylindrical braking drum. A top of the fins is machined at either side of the predetermined location to include a shoulder at the end thereof away from the opened end. A steel band is formed and secured to the braking drum at the top of the fins to encircle the braking drum at the predetermined location.

5 Claims, 4 Drawing Figures

METHOD OF FORMING A BRAKE DRUM

BACKGROUND OF THE INVENTION

1. Field of the Invention

This invention relates to the method of forming a brake drum and, more specifically, such a brake drum which has a plurality of generally axially extending fins around an exterior surface thereof and a steel band secured to the top of the fins and encircling the braking drum.

2. Description of the Prior Art

Although drum brakes and the brake drums therefore are well known in the prior art, there remains a problem with dissipation of heat to ensure that there is effective braking during extensive use. Accordingly, many brake drums have heretofore employed fins or other cooling surfaces about the exterior surface thereof as a means for directing air along the exterior surface to remove the heat generated in the brake drum. However, many brake drums of this type include fins which are oriented helically or at an angle to provide an easy path for the cooling air therebetween. On the other hand, providing fins of this type has significantly complicated manufacture since most such brake drums are cast and casting in this manner normally requires some type of core unless the manufacture includes some means for otherwise cutting or forming grooves or fins.

Additionally, in any such brake drum, there remains a concern for its overall strength. Accordingly, it would be advantageous to incorporate any means which would improve the overall strength of the brake drum without unduly adding to its weight.

SUMMARY OF THE INVENTION

It is therefore an object of this invention to provide a method of forming a brake drum by simplified casting while providing a steel band therefor which will add to the overall strength of the brake drum.

These and other objects of the invention are provided in a preferred embodiment thereof including the method of forming a brake drum including the steps of casting an iron cylindrical braking drum with a flange end and an opened end to include a plurality of generally axially extending fins around an exterior surface thereof. The casting includes providing the fins with radially extending side walls which diverge along a length thereof from the opened end to a widest distance therebetween at the predetermined location from the opened end and converge along the length thereof from the predetermined location to the flange end. Accordingly, adjacent side walls of adjacent fins define a space therebetween having its narrowest portion at the predetermined location. A braking surface is machined about an interior surface of the cylindrical braking drum. A top of the fins is machined at either side of the predetermined location to include a shoulder at an end thereof away from the opened end. A steel band is formed and secured to the braking drum at the top of the fins to encircle the braking drum at the predetermined location.

DETAILED DESCRIPTION OF THE PREFERRED EMBODIMENT

Figure 1:
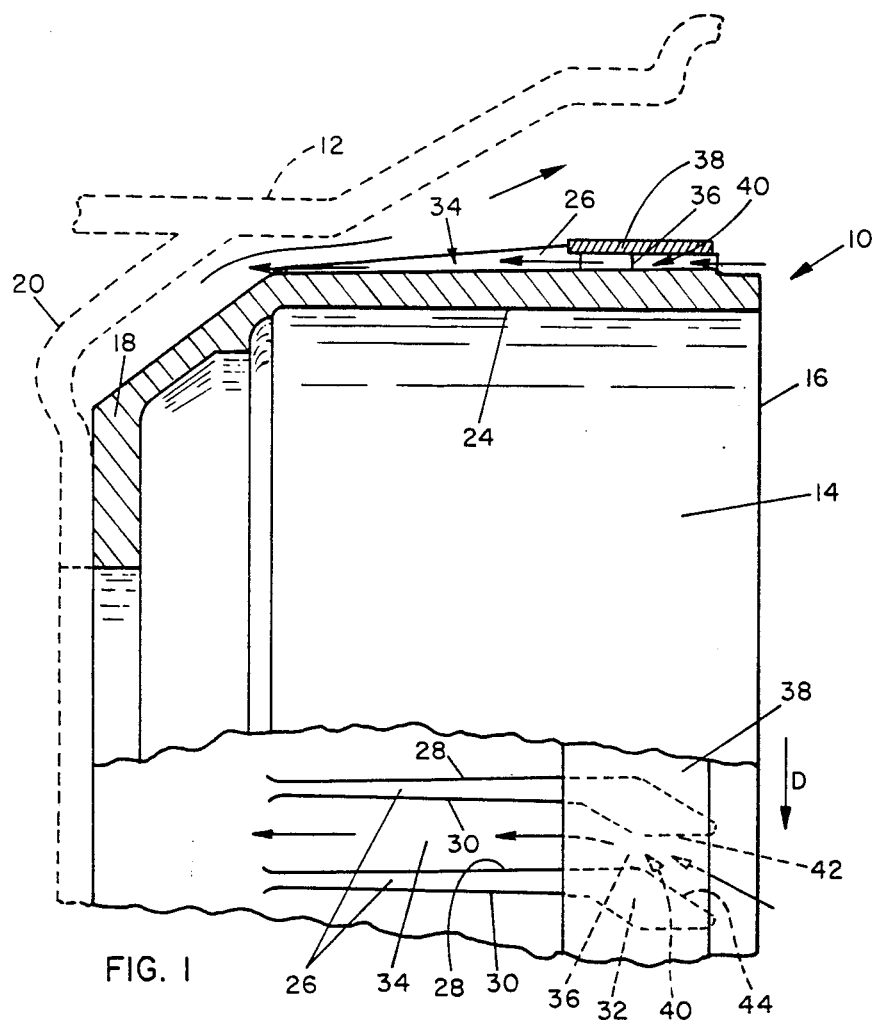
FIG. 1 is a fragmentary view, partially in section of the preferred drum brake including various features of the invention.

As seen in FIG. 1, the preferred brake drum 10 is mounted for rotation with a hub (not shown) supporting a wheel 12 of a heavy duty truck or trailer. The brake drum 10 includes the cylindrical braking drum 14 having an opened end 16 and a flange end 18 by which the brake drum 10 is secured to the hub. As shown in FIG. 1, the wheel 12 with which the preferred brake drum 10 is associated is only slightly larger than the brake drum 10 and is of such a design which includes no significant openings or holes through the radial wall 20 thereof. In other words, where the rim portion of the wheel 12 is to be significantly larger than the brake drum 10 or to include a plurality of openings in the radial wall 20, such as is found in spoked wheels, then the movement of cooling air about the brake drum 10 would not be considered as significant. However, with such a configuration in which the flow of air is restricted, it is desirable to include an efficient, reliable means for cooling the exterior surface 22 of the brake drum 10. Obviously, cooling the brake drum surface 22 will allow heat to also be dissipated from the braking surface 24 of the brake drum 10.

To facilitate the air cooling, the preferred brake drum 10 is provided a plurality of generally axially extending fins 26 around the exterior surface 22. However, the preferred fins 26 are not designed to extend helically about the exterior surface 22 but are instead provided a contour which will be seen to produce the desired flow of air therebetween. Specifically, each of the fins 26 has radially extending side walls 28, 30 which diverge along a length thereof from the opened end 16 to have a widest distance therebetween at a predetermined location 32 from the opened end 16. The side walls 28, 30 converge along the length thereof from the predetermined location 32 to their terminal end at the flanged end 18 of the braking drum 14. Accordingly, adjacent side walls 30, 28 of adjacent fins 26 define a space 34 therebetween having its narrowest portion 36 at the predetermined location 32.

However, providing a contour such as described would not ensure the desired air flow as indicated by the plurality of arrows shown in FIG. 1. Accordingly, to produce a venturi effect at the narrowest portion 36 of the space 34, a steel band 38 is secured to and encircles the braking drum 14 at the predetermined location 32. The steel band cooperates with the adjacent side walls 30, 28 and the exterior surface 22 of the braking drum 14 to define a cooling air channel 40 at the narrowest portion 36 of each of the spaces 34.

To best produce the desired air flow as shown in FIG. 1, the predetermined location 32 and the encircling steel band 38 are located closer to the opened end 16 than the flanged end 18 of the braking drum 14. Locating the steel band 38 in this region significantly adds to the overall strength of the preferred brake drum 10 since the greater forces acting thereon will be experienced at the opened end 16. Further, since the steel band 38 will add significant strength to the brake drum 10 when compared to the cast iron which is utilized for the braking drum 14, the overall configuration is significantly stronger without adding unduly to the overall weight of the brake drum 10.

Although the preferred brake drum 10 as described hereinabove would produce some venturi effect to cause the desired air flow in the space 34 between the fins 26, there is another preferred feature of the contour of the fins 26 which will further encourage the desired air flow without unduly complicating the casting of the brake drum 10. Specifically, as seen in FIG. 1, the brake drum 10 is designed to primarily rotate in the direction as indicated by the arrow D. With the brake drum 10 primarily rotating in a counterclockwise direction when viewed from the right, a portion 42 of the side walls 30 of each of the fins 26 between the opened end 16 and the predetermined location 32 and facing toward the direction D extends axially. A corresponding portion 44 of the side walls 28 of each adjacent fin 26 between the opened end 14 and the predetermined location 32 and facing away from the normal direction D is inclined from the opened end 16 to the predetermined location 32 in a direction which is circumferentially opposite from the normal direction D of rotation. Accordingly, the space 34 is provided a converging profile at the opened end 16 which tends to scoop the air into the narrowest portion 36 thereof in order to ensure the venturi action on the air will be initiated for proper flow through the space 34.

Figure 2:
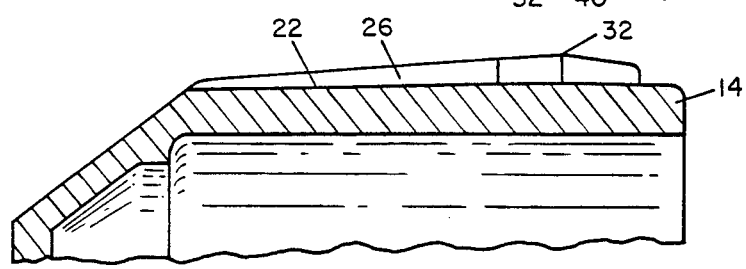
FIG. 2 is a fragmentary sectional view of the cylindrical braking drum of the invention as it is initially cast.

In order to provide the preferred brake drum 10, the cylindrical braking drum 14 is initially cast of iron as seen in FIG. 2. Since the profile of the fins 26 do not include any portion thereof which overlap in an axial direction, the preferred braking drum 14 is cast with the axially extending fins 26 thereof being formed by dies which would meet at the predetermined location 32. As a result, the preferred cylindrical braking drum 14 can be manufactured in green sand without requiring cores during the casting operation.

Figures 3, 4:
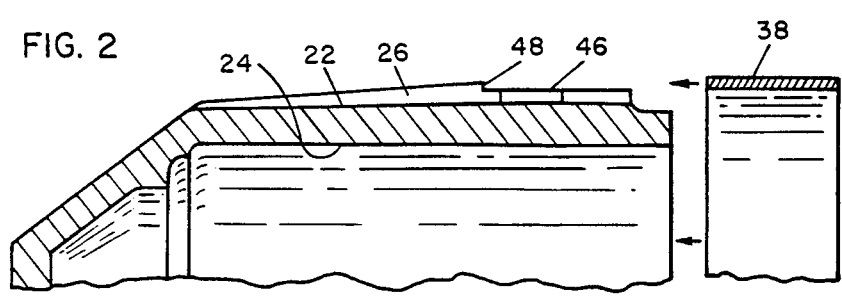
FIG. 3 is a sectional view of the braking drum as seen in FIG. 2 after machining.
FIG. 4 is a fragmentary sectional view of the steel band prior to installation on the cylindrical braking drum.

As seen in FIG. 3, the cast braking drum 14 of FIG. 2 is machined to provide the desired braking surface 24 and to remove the top 46 of the fins 26 in a location thereof for receipt of the steel band 38. Specifically, a shoulder 48 is provided to establish the desired location of the end of the steel band 38.

As seen in FIG. 4, the steel band 38 is formed in a continuous ring and is sized to be received on the surface at the top 46 of each of the fins 26. It has been found that there are two effective means for mounting and securing the steel band 38 on the fins 26. First, it is possible for the steel band 38 to be simply pressed fitted over the top 46 until contact is made at the shoulder 48. However, depending on the desired dimensions of the brake drum 10 and the type of fit desired for the steel band 38 thereof, a second means includes heating the steel band to a temperature of 1000° F. to 1100° F. and then positioning the steel band at the predetermined location 32 as described and allowing it to cool.

Although the preferred embodiment of the invention is described hereinabove, it should be clear that any number of alterations could be made thereto without departing from the scope of the invention as claimed.

I claim:

1. A method of forming a brake drum comprising the steps of:

casting an iron cylindrical braking drum with a flange end and an opened end to include a plurality of generally axially extending fins around an exterior surface thereof, said casting including providing each of said fins with radially extending side walls which diverge along a length thereof from said opened end to a widest distance therebetween at a predetermined location from said opened end and converge along said length thereof from said predetermined location to said flange end, whereby adjacent said side walls of adjacent said fins define a space therebetween having its narrowest portion at said predetermined location;

machining a braking surface about an interior of said cylindrical braking drum;

machining the top of said fins on either side of said predetermined locations to form a shoulder extending around the drum and spaced inwardly of the opened end;

forming a steel band; and securing said steel band to said braking drum at the machined top of said fins to encircle said braking drum and engage said shoulder to define, with adjacent sides of the fins, a plurality of venturi-shaped cooling channels at said predetermined locations.

2. The method of forming a brake drum as set forth in claim 1, wherein said step of casting is accomplished with two dies that meet at said predetermined location which are closer to said opened end than said flange end.

3. A method of forming a brake drum as set forth in claim 1, wherein the steps of casting includes establishing a primary direction of rotation of said brake drum by providing a portion of one of said adjacent side walls of each of said fins between said opened end and said predetermined location and facing toward said direction to extend axially and a corresponding portion of one of said side walls of each of said fins between said opened end and said predetermined location and facing away from said direction to incline from said opened end to said predetermined location in a direction which is circumferentially opposite from said direction.

4. A method of forming a brake drum as set forth in claim 1, wherein said steel band is press fit on said top of said fins until making contact with said shoulder.

5. A method of forming a brake drum as set forth in claim 1, wherein said steel band is heated to cause expansion thereof, positioned about said top of said fins against said shoulder, and allowed to cool to be secured about said braking drum.

* * * * *